April 16, 1963 L. E. TYLER 3,085,807
FERTILIZER SPREADER
Filed May 11, 1961 8 Sheets-Sheet 3

INVENTOR.
LOREN E. TYLER
BY
Braddock and Braddock
ATTORNEYS

April 16, 1963

L. E. TYLER 3,085,807

FERTILIZER SPREADER

Filed May 11, 1961

INVENTOR.
LOREN E. TYLER
BY
Braddock and Braddock
ATTORNEYS

April 16, 1963 L. E. TYLER 3,085,807
FERTILIZER SPREADER
Filed May 11, 1961 8 Sheets-Sheet 8

INVENTOR.
LOREN E. TYLER
BY
Braddock and Braddock
ATTORNEYS

United States Patent Office 3,085,807
Patented Apr. 16, 1963

3,085,807
FERTILIZER SPREADER
Loren E. Tyler, 1110 Atlantic Ave., Benson, Minn.
Filed May 11, 1961, Ser. No. 110,310
4 Claims. (Cl. 275—8)

This is a continuation-in-part of my application for Fertilizer Spreader, Serial No. 71,814, filed November 25, 1960, and now abandoned.

This invention has relation to a fertilizer spreader and more particularly to a spreader of granular or similar materials including a wagon box mounted on a trailer and provided with a distributing mechanism including twin distributor fans or discs driven at a uniform or desired rate through the instrumentality of the power take off from a tractor or other towing vehicle; and with a feed mechanism including an endless conveyor belt moving over the bottom of the wagon box to deliver fertilizer to said distributing mechanism at a rate commensurate with the speed of movement of the trailer over the ground being fertilized.

Mechanism for accomplishing this uniform distribution of fertilizer per lineal foot traveled by the trailer includes a friction wheel normally held in driving contact with one of the trailer wheels. This friction wheel is movable to position in spaced relation to said trailer wheel when it is desired to transport the trailer without distribution of fertilizer therefrom.

The trailer wheels of the present invention are mounted in a novel way with respect to the friction wheel so that the satisfactory minimum driving pressure between one of said trailer wheels and said friction wheel is established and maintained when the trailer is in its unloaded or minimum load condition and so that the tension and friction between the wheels is increased with increase of load within the wagon box and is likewise increased when the unevenness of the terrain causes the wagon box to be more or less instantaneously forced downwardly with respect to said trailer wheel.

The twin distributor discs are located at the rear of the spreader and are positioned at such an angle with respect to the ground that granuals discharged rearwardly and laterally outwardly from the spreader have an upward component of travel.

In a device made according to the present invention, the distributor discs are provided with upstanding distributor blades or vanes each of which extends from position at the outermost edge of the distributor disc to position radially toward the center of rotation of the disc, but terminates substantially short of the center of rotation. For example, blades terminating less than half of the radius of the disc from the center of rotation thereof have been found to be satisfactory. The particles to be discharged from the discs are deposited by the feed mechanism of the invention on the discs between the centers of rotation thereof and the inner most ends of the fan blades. The particles are not "batted" by the blades, but move outwardly in the plane of the disc under centrifugal force and then are thrown outwardly by the blades. The forces acting on each of the particles arriving at any particular location on the disc between the innermost ends of the blades and the center of rotation thereof are substantially uniform, and the pattern of material deposited on the ground will also be readily predictable and highly uniform. By moving the feed mechanism to vary the exact positioning of the deposit of particles onto the distributor discs, the concentration of fertilizer material across the discharge path from the distributor discs can be regulated.

Heretofore it has been customary to "distribute" fertilizer and other valuable materials entirely within hoods which arbitrarily limited the travel of a particular particle in any particular direction. This arbitrarily limited the size of the path over which the fertilizer spreader could be effective. In conventional distribution systems the particles tended to strike nearby field stubble and fall to the ground much short of their intended position thus to interfere with even distribution of fertilizer over the ground. By "tilting" each of the planes of each of the twin distributor discs to extend upwardly to the rear and to its own side, the particles are thrown over any stubble or other field obstructions which would immediately terminate their flight, and the resulting pattern is and remains substantially uniform. Any drift occasioned by breezes or wind due to this tilt will be substantially uniform in direction as long as the wind conditions remain uniform the resulting overall pattern will remain uniform.

In FIGS. 1 through 8, a fertilizer spreader 10 of a first form of the invention includes a trailer frame 11 having a pair of trailer wheel supporting torsion shafts 12 and 13 rotatably mounted with respect thereto on bearings 14, 14 and 15, 15, respectively, and depending downwardly from said frame. A pair of torsion springs 16, 16 are mounted in surrounding relationship to each of the shafts 12 and 13. Outer end portions 17 of each of said torsion springs are fastened to or otherwise fixedly positioned with respect to one of said bearings 14, 14 or 15, 15, and an inner end portion 18 of each of said springs is welded to its corresponding shaft. The trailer wheel supporting shafts 12 and 13 include offset portions 20, 20 and 21, 21 respectively, and outwardly extending spindles 22, 22 and 23, 23 respectively. Forward trailer wheels 24 and 25 are supported on the spindles 22, 22, and rear trailer wheels 26, 26 are supported on spindles 23, 23. As perhaps best seen in FIG. 1, the action of the wheels 24, 25 will be such that they will move slightly forwardly and upwardly around the axis of supporting shaft 12 as load is applied to the trailer and as the trailer frame bounces over uneven terrain. This is important in the drive of the fertilizer feed mechanism as will be later pointed out.

The trailer frame 11 supports a wagon box 27 which includes vertical front end wall 28 and rear end wall 29, upper parallel, vertical side walls 30, 30, converging, bin-like walls 31, 31 and lower parallel, vertical side walls 32 and 33. The bottom of the wagon box 27 is closed with a horizontal sheet metal floor 34 which extends rearwardly from the wagon box to terminate in position over a distributing mechanism to be described.

The fertilizer feed mechanism of the present invention includes an endless conveyor belt 35 of mesh construction having an upper portion thereof in adjacent sliding contact with an upper surface of floor 34. This belt 35 is rotatably mounted over an idler roller 36 at a forward end of said wagon box. This idler roller 36 on a conveyor belt idler roller axle 38 is supported in bearings 37, 37. A rearward end of said fertilizer conveyor belt 35 is driven over a drive roller 48 rotatably mounted on conveyor belt drive roller axle 40 with respect to side walls 32 and 33 as at 49 and 39 respectively, and said axle 40 extends outwardly from said roller to fixedly support a conveyor belt drive sprocket 41. This sprocket 41 is driven by an endless roller chain 42 through the instrumentality of a sprocket 43 fixedly mounted on a cross shaft 44 which is rotatable with respect to the trailer frame 11. A friction wheel supporting assembly 45 is pivotally mounted with respect to said cross shaft 44 through the instrumentality of bearings 46, 46. Friction wheel bearings 47, 47 are also supported on said supporting assembly 45 to mount a friction wheel axle 50 which, in turn, carries a friction wheel 51. This friction wheel 51 can preferably be constituted as a small pneumatic tire and is positioned to be in contacting alignment with the friction tread of the tire on forward trailer wheel 24. The friction wheel axle 50 also carries a drive sprocket 52 which is mounted to rotate with the friction wheel 51, and this sprocket drives an endless roller chain 53 which in turn drives a sprocket 54. Sprocket 54 is keyed to the cross shaft 44 which in turn is keyed to the sprocket 43.

An operating lever 60 is pivotally fastened to trailer frame 11 with a spring loaded pivot bolt 61 and has a link 62 pivotally fastened adjacent a lower end thereof. Link 62 extends rearwardly and slidably engages a hole in a bracket 58 that is fixedly attached to support assembly 45. A first pin 56 extends through link 62 and keeps said link from coming out of the bracket 58. A compression coil spring 55 is positioned over link 62 between the bracket 58 and lever 60 and is retained in contacting relationship with the bracket by a second pin 57. The operating lever is movable from a first position with the friction wheel 51 in clearing relationship with the forward wheel 24 of the trailer to a second position wherein the friction wheel is moved to drivingly contact said forward wheel. The stop bracket 59 serves to lock the lever in either of these positions. When the lever is to be moved, a lower portion thereof is moved against the action of spring loaded pivot bolt 61 to clear bracket 59 so that the lever may be moved to its desired position. When the lever is in said second position spring 55 will resiliently urge the friction wheel into contact with wheel 24 of the trailer. The spring loading of the friction wheel insures that the friction wheel will continue to be driven as the trailer moves over uneven ground.

Distributing Mechanism

Figure 3:
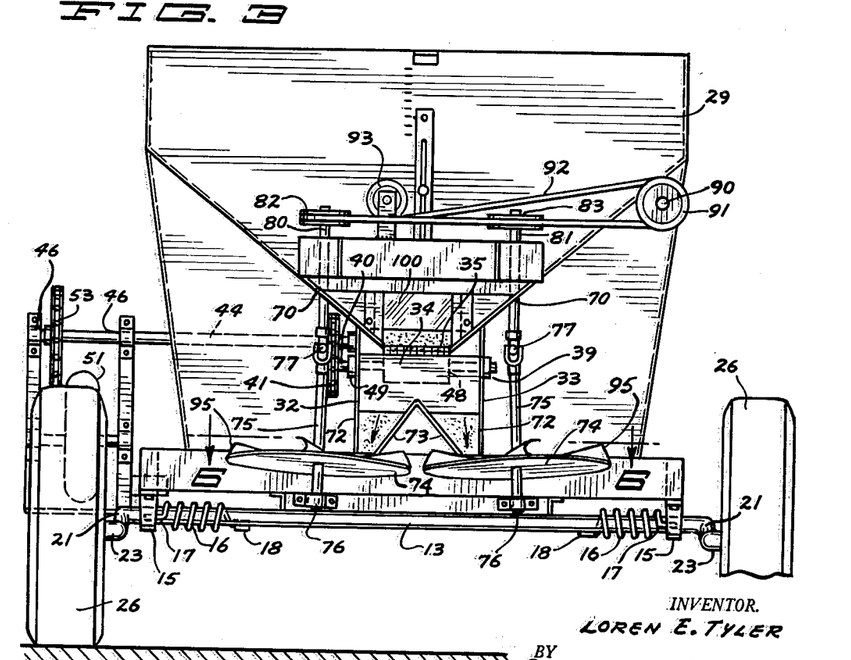
FIG. 3 is a rear end elevational view of the device of FIGS. 1 and 2.

A portion of the bin-like walls 31, 31 extend rearwardly of the wagon box 27 to form funnel-like walls 70, 70 of a distributing chute indicated generally as 71. As best seen in FIG. 3, these walls 70, 70 terminate approximately in alignment with and at the outer edges of the endless conveyor belt 35. The lower portion of the distributing chute 71 includes vertical chute side walls 72, 72 which are constituted as integral outward extensions of the lower parallel vertical side walls 32 and 33 of the wagon box 27. A V-shaped divider 73 is positioned in vertical alignment with the outer end of the horizontal sheet metal floor 34 of the wagon box 27 and in vertical alignment with the discharge point of the conveyor belt 35.

A pair of twin distributor discs or fans 74, 74 are rotatably mounted on disc axles 75, 75 and have blades 96 extending upwardly therefrom. These axles are mounted in bearings 76, 76 which extend rearwardly outwardly from the frame 11 of the trailer. These axles are connected through universal joints 77, 77 to drive shafts 80 and 81 which have drive pulleys 82 and 83, respectively, drivingly connected to said shafts.

Figure 2:
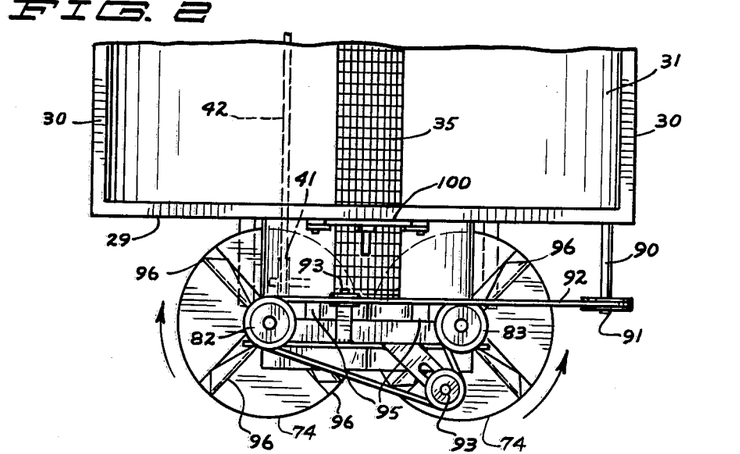
FIG. 2 is a fragmentary top plan view of a rear end of said trailer disclosing an endless conveyor belt and twin distributor discs thereon.
Figure 6:
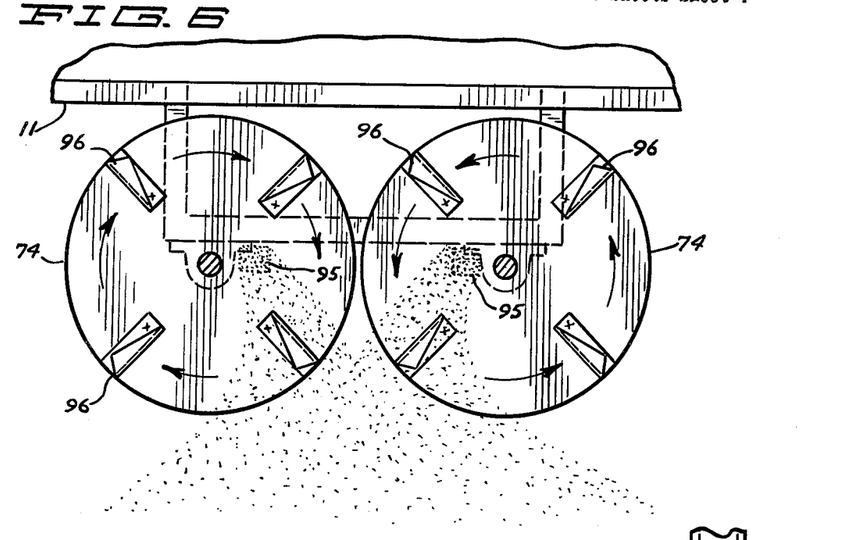
FIG. 6 is a sectional view taken as on line 6—6 in FIG. 3.
Figure 7:
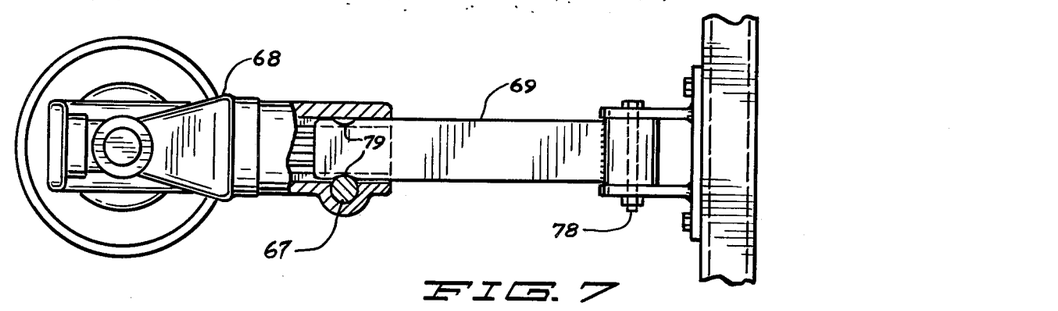
FIG. 7 is a sectional view taken as on line 7—7 in FIG. 1.
Figure 8:
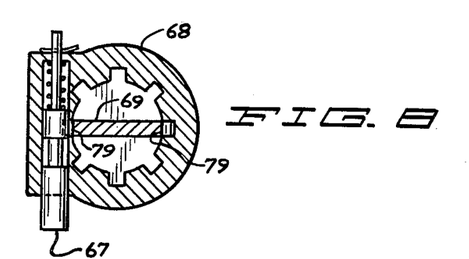
FIG. 8 is a sectional view taken as on line 8—8 in FIG. 1.
Figure 9:
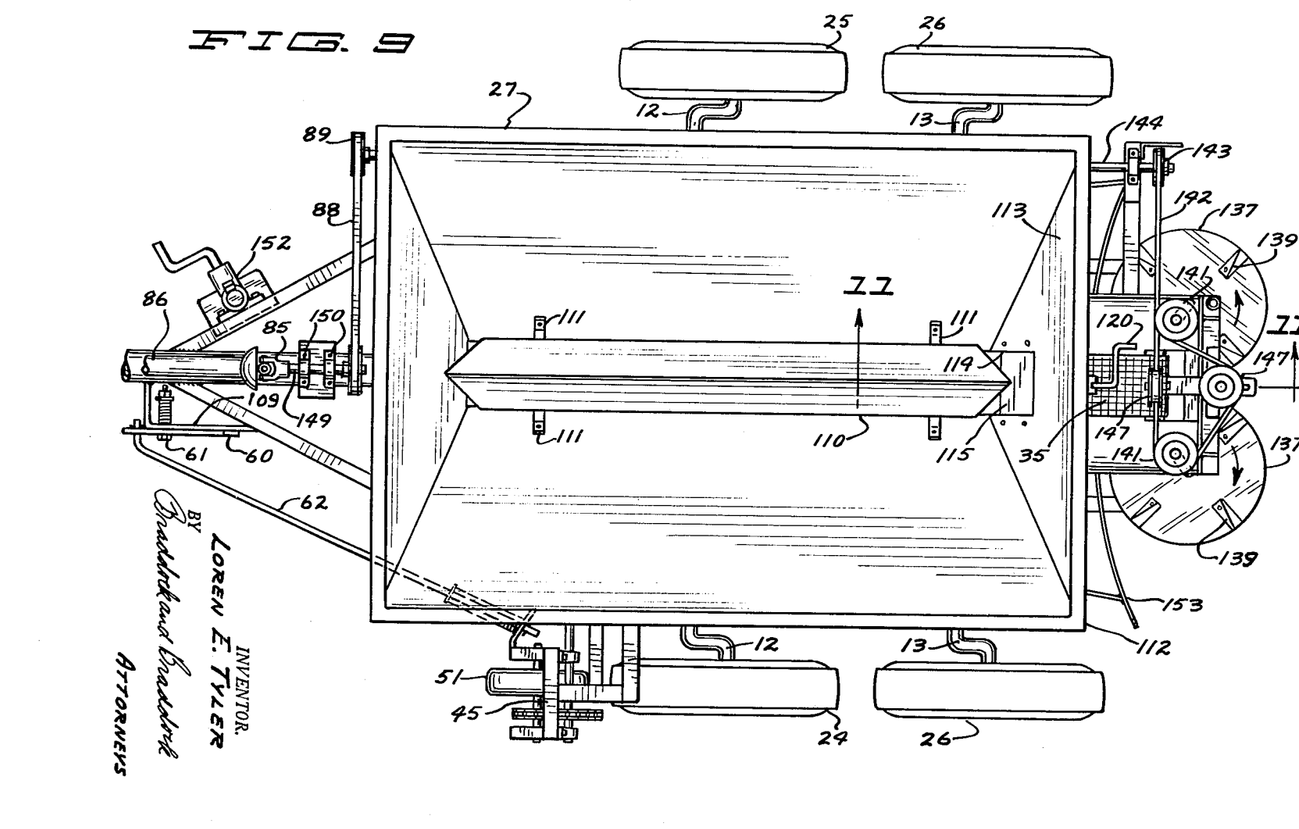
FIG. 9 is a top plan view of a second form of the present invention.
Figure 10:
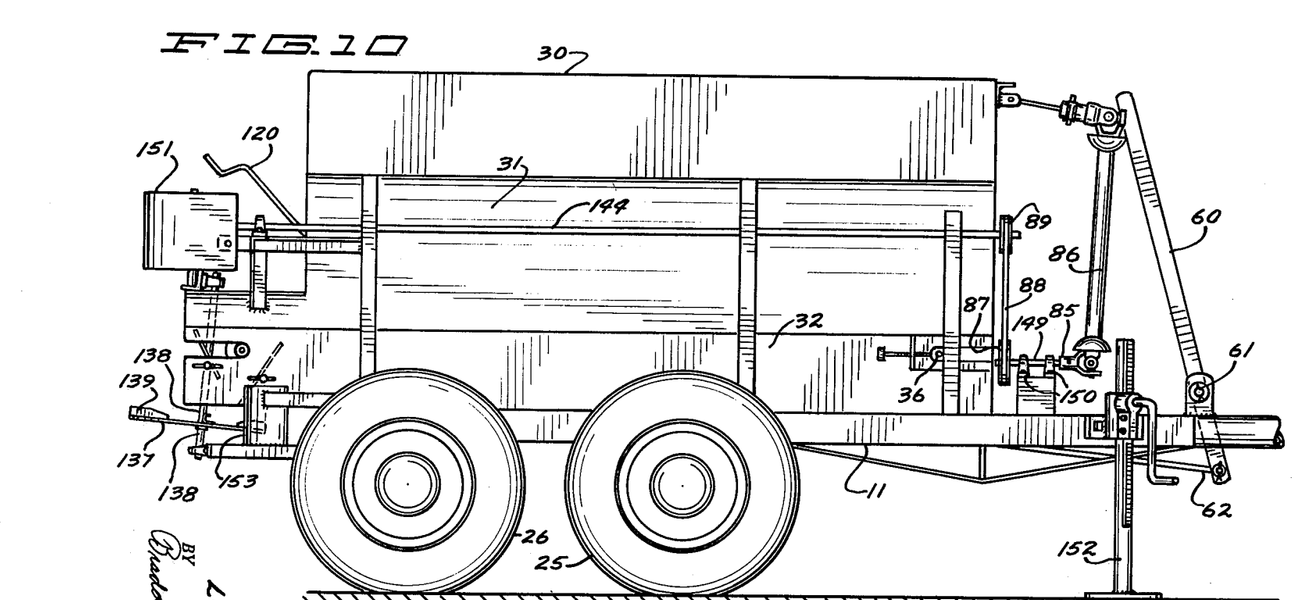
FIG. 10 is a side elevational view of the device of FIG. 9.
Figure 11:
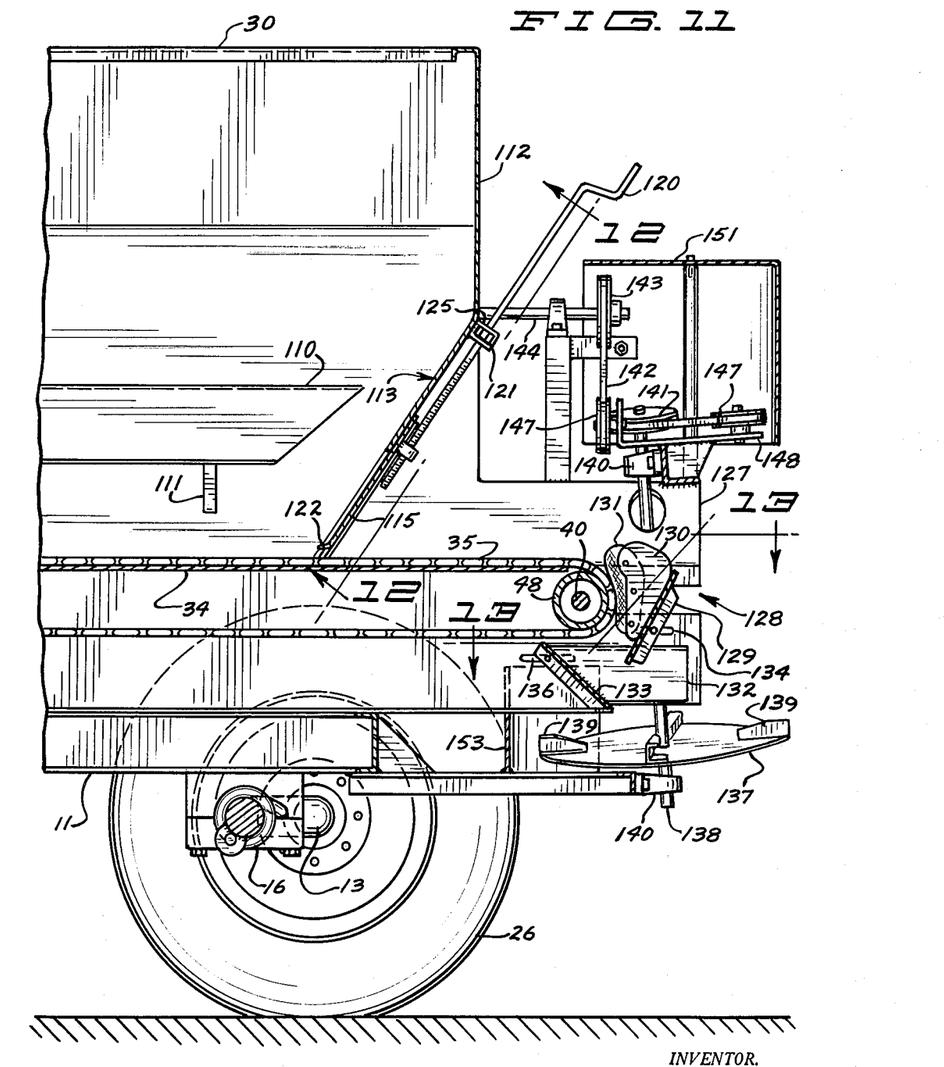
FIG. 11 is a fragmentary vertical sectional view taken as on line 11—11 in FIG. 9.
Figure 12:
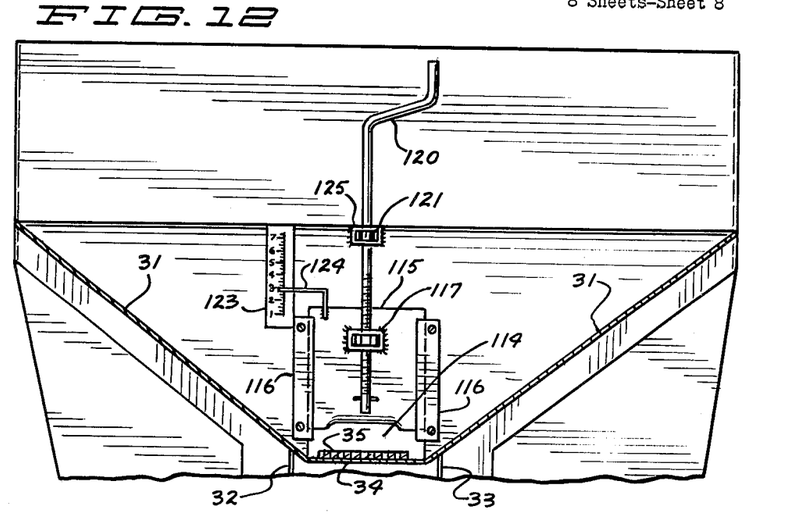
FIG. 12 is a fragmentary sectional view taken as on line 12—12 in FIG. 11.
Figure 13:
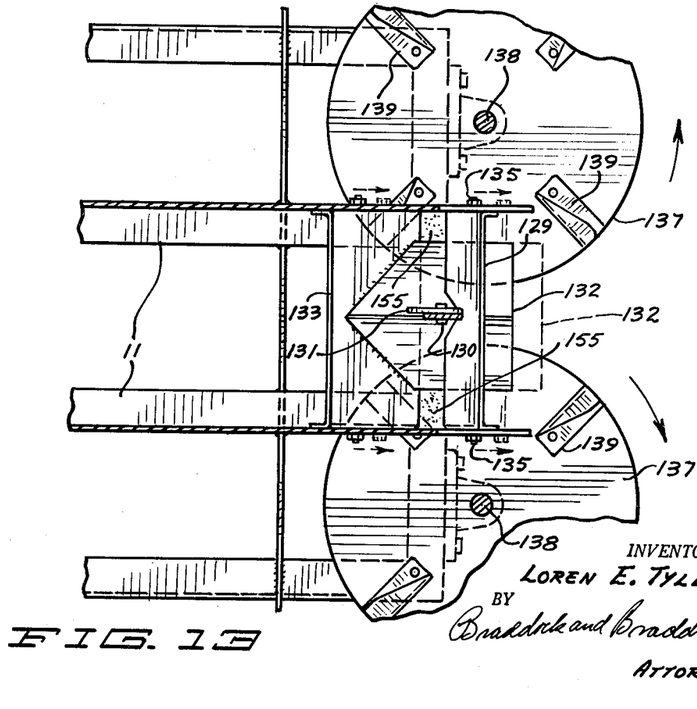
FIG. 13 is a fragmentary horizontal sectional view taken as on line 13—13 in FIG. 11.
Figure 14:
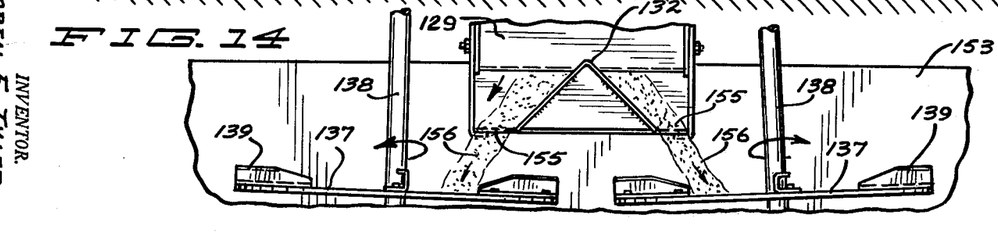
FIG. 14 is a fragmentary rear elevational view of the device of FIG. 13, showing the position at which material will be deposited onto the twin distributing discs.

As best seen in FIGS. 2, 3 and 6, two outlets 95, 95 of the distributing chute 71 are each positioned to drop fertilizer discharged from the conveyor belt 35 onto one of the twin distributor discs 74, 74 at position just clear of the inwardly extending edge of the blades 96. The blades do not strike the fertilizer material as it drops downwardly toward the disc. The fertilizer flows outwardly on each of the discs to circumferential alignment with the blades from centrifugal force and once it is contacted by the blades of that disc is discharged evenly therefrom in the plane of the disc.

This matter of dropping the fertilizer onto the discs 74, 74 clear of the blades has completely overcome the problems which existed when fertilizer was dropped in circumferential alignment with the blades as pointed out above. In distributing systems where particles were discharged into the blades directly, the rapidly moving blades striking particles while they were in the air caused them to be deposited along a narrow strip longitudinally aligned with the direction of movement of the machine. Such distribution was very undesirable, as it did not allow coverage of a very wide swath on each pass through the field and did not result in a uniformly graduated distribution pattern from high center density to lower outer density.

It is to be understood, however, that when fertilizer granules resting on the upper surface of the discs 74 move radially outwardly into circumferential alignment with the blades, a projection of these granules will be outwardly in the plane of the discs, but will occur from the point where the first such material becomes aligned with the inner edge of the blades to the point where all of the material has left the discs. The distribution pattern is suggested in FIG. 6; and it has been found to be a satisfactorily uniform pattern.

Figure 1:
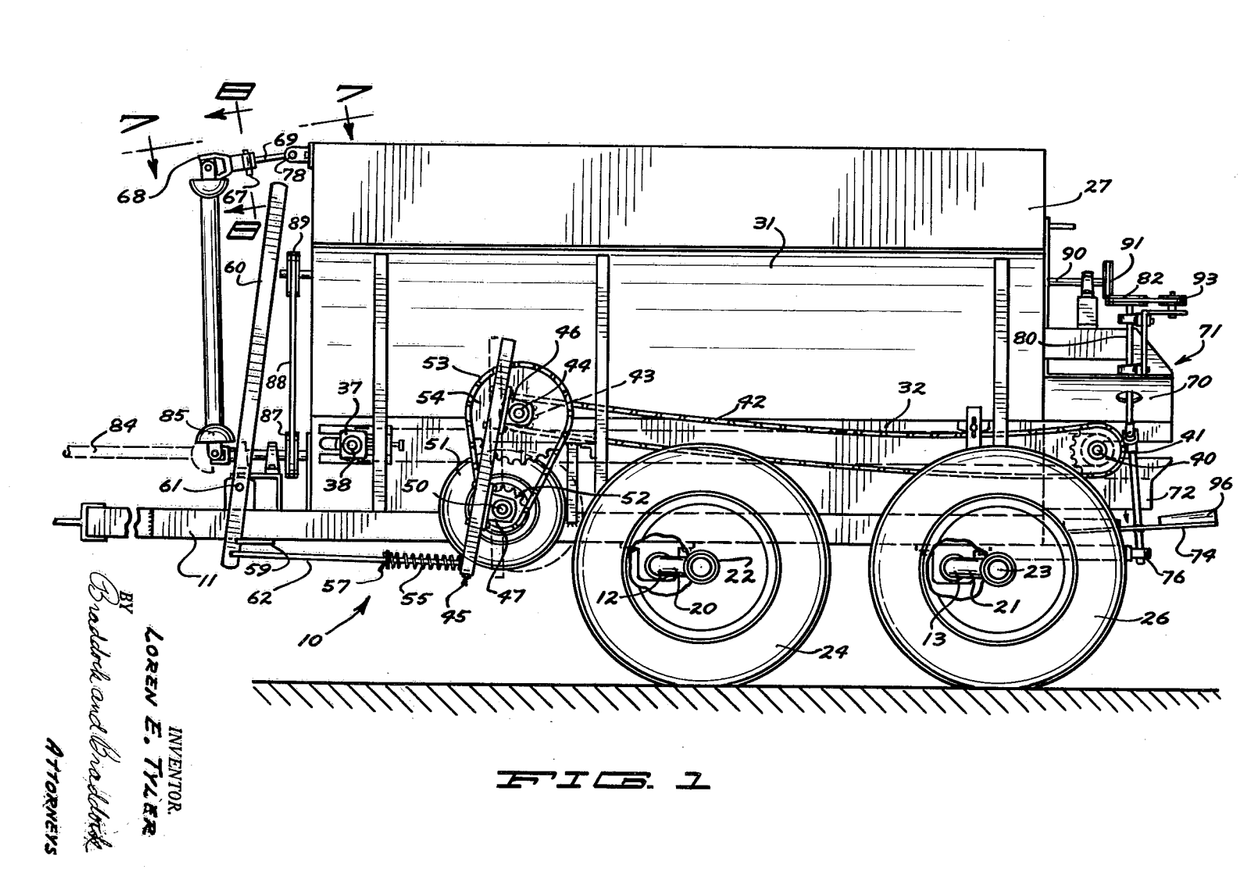
FIG. 1 is a side elevational view of a fertilizer spreader trailer made according to a first form of the present invention.
Figure 4:
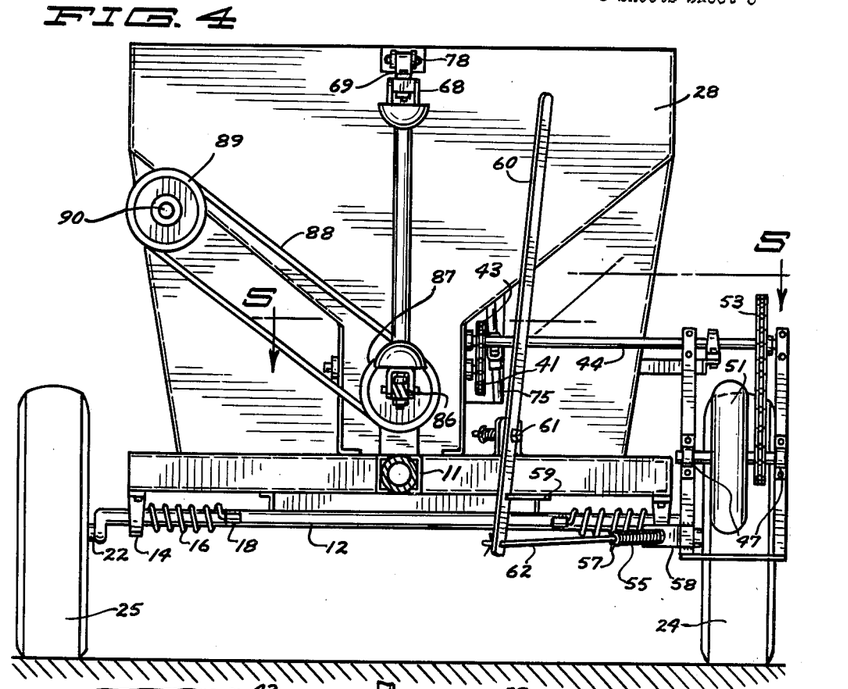
FIG. 4 is a front end elevational view of said device.
Figure 5:
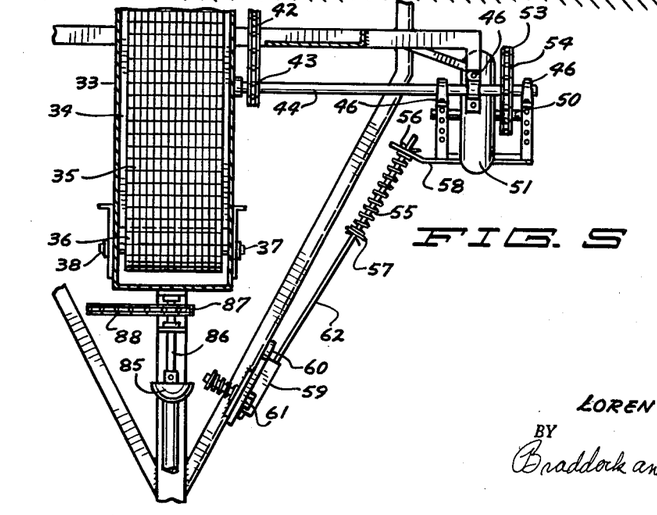
FIG. 5 is a fragmentary horizontal sectional view taken substantially on a line 5—5 in FIG. 4.

As will be best seen in FIGS. 1 and 4, a power take-off shaft 84 will be connected to the power take-off of a tractor (not shown) and will drive through universal joint 85 to the shaft 86 on which is drivingly mounted a sheave 87. This is connected through drive belt 88 to a sheave 89 which drives shaft 90. This shaft 90 extends the length of the wagon box 27 and is drivingly associated with a sheave 91 on which is mounted a distributor fan belt 92. The pattern of this drive belt 92 is best seen in FIG. 2. The belt 92 is drivingly associated with said drive pulleys 82 and 83 and with an idler pulley or sheave 93 which is adjustably and rotatably mounted to the frame 11 of the trailer.

When the power take-off shaft 84 is not attached to the tractor or prime mover it may be rotated upwardly out of the way and retained by fastening a quick coupling universal joint 68 to a strap 69 that is pivotally mounted, as at 78, to a bracket extending from forward wall 28 of the spreader box. Strap 69 is of dimension to slide into the present standard A.S.A.E. tractor power take-off shaft spline and may be made to utilize any other standard spline. A pair of notches 79, 79 are located in the edges of strap 69 and each are of configuration to receive a lock plunger 67 of universal joint 68 and thereby prevent the joint from coming disengaged from the strap. When the power take-off shaft is to be used, the lock plunger is depressed until it clears the edges of the strap and the universal joint can be slid off the strap and installed on a tractor or other prime mover. Retaining the power take-off shaft upward out of the way eliminates damage to the shaft and helps prevent accidents caused by the shaft interfering with normal movement.

*Operation*

Utilizing the extremely efficient, inexpensive, lightweight trailer of the present invention, the farmer can, using his own tractor, fertilize his own field at what he considers to be the best rate per acre and can operate at his own speed in his own time.

The expense involved in manufacture of such a trailer is sufficiently small that a farmer can own his own unit; or, more usually, a country elevator operator or other handler of fertilizing materials can own several such units and can rent them to the farmer at the time the farmer purchases the fertilizer.

Typically then, the farmer will have the fertilizer he has purchased from the fertilizer dealer loaded into the wagon box 27 of the trailer mounted fertilizer spreader of the invention and can pull this trailer to his field over the road with the operating lever 60 in its first position and consequently the friction wheel 51 in the position as seen in FIG. 1. This pickup and delivery of the spreader and the fertilizer to the farm fields can be accomplished with any farm vehicle capable of good over-the-road speed, as the spreader of the present invention is designed for transportation at highway speeds.

When the spreader arrives at the field to be fertilized, it will be hitched to a tractor having a power take-off, and the power take-off shaft 84 will be coupled to this take-off in any usual or preferred manner. The spreader will be towed to position on the field where it is desired that spreading is to begin, and the power take-off mechanism will be engaged. This will cause rotation of the slightly outwardly and upwardly angled distributor discs 74, 74 through the instrumentality of the drive members between the universal joint 85 and the disc axles 75, 75 as previously explained.

The lever 60 will be moved to its second position with the friction wheel engaging the forward wheel 24 and will be retained in this position by stop 59. The action of coil spring 55 on the wheel support assembly 45 will resiliently urge the friction wheel into operational contact with the tire on forward wheel 24 as seen in dotted lines in FIG. 1. Movement of the wheel 24 about its spindle 22 will, therefore, cause the friction wheel 51 to rotate, thus driving the top flight of the conveyor belt 35 in direction toward the rear of the wagon box. This will cause fertilizing materials such as chemicals in the wagon box to be transported with said mesh conveyor belt toward the end of the wagon box and will cause these materials to be delivered to the distributing mechanism at a rate commensurate with the speed of the trailer over the ground.

When the trailer is standing still and the wheel 24 is not rotating, there will be no feed of fertilizer from the conveyor belt to the distributing mechanism.

Variations in speed of the movement of the trailer over the ground will cause identical variations in feed of the fertilizer from the conveyor belt to the distributing mechanism. The distributing discs are rotated at a sufficiently high rate to properly handle flow of fertilizer when the trailer is making its highest possible speed over the ground to be fertilized, so that distribution of fertilizer per lineal foot of trailer travel is entirely uniform.

The feed of fertilizing material from the flexible belt 35 will be down between the vertical chute side walls 72, 72 and onto the V-shaped divider 73. At this point the materials will be divided equally and delivered through the outlets 95, 95 which, as previously explained, are positioned above the distributor discs and just clear of and inward from the inner ends of the blades 96. After passing through said opening these materials will drop freely onto the fan. Centrifugal force on the granular material due to frictional contact with the upper surface of the discs will cause the granular material to move evenly toward the outer edges of the disc. When the granular material engages one of blades 96 it is rapidly accelerated and thrown clear of the fan in a uniform pattern. The speed and arrangement of parts is such that virtually all materials leave the disc proper before they have been in contact with disc and blades for much more than 90 degrees of rotation of said disc. The velocity and direction of travel imparted by the blades to the granular particles will result in a wide pattern with a substantially uniform rate of variation across the width thereof. The outer areas from each fan will be more lightly sown and the outer area of the next spreading path will normally overlap that of the previous path to insure an even application over the entire field without skips or strips of excessive amounts of fertilizer.

While the rectangular outlets or openings, indicated 95 in FIGS. 2 and 6, for discharge of fertilizing materials onto the discs 74, 74 are illustrated as being located centered substantially on a line between the center of fan axles 75, 75 it is to be understood that the positioning of these discharge points could be varied depending upon the broadcast pattern desired, the configuration and size of the discs 74, 74 and blades 96, the speed of rotation of said fans and other factors. This will be fully explained in connection with the second form of the invention.

When the spreader is fully loaded, and is first put into operation on the field, the load on the flexible conveyor belt 35 will be greatest due to the weight of fertilizer materials bearing down thereon. At this point, however, the trailer frame 11 will be deflected downwardly with respect to the wheels, and the offset portion 20 of the trailer wheel supporting torsion shaft 12 will cause the spindle 22 and the wheel 24 to be moved slightly toward the front of the trailer, forcing the friction wheel 51 also in forward direction, thus compressing coil spring 55 and increasing the pressure between the friction wheel and the tire of trailer wheel 24 to provide the extra power needed to overcome the extra conveyor belt load.

The rear end wall 29 of the wagon box 27 will terminate in spaced relationship to an upper surface of the flexible conveyor belt 35 and an adjustable sliding gate 100 may be provided on this rear wall 29 so that the gap between the upper surface of the conveyor belt and the bottom of the gate or wall can be adjusted to insure the desired feed of fertilizer per lineal foot of trailer travel. It is to be noted, however, that the horizontal sheet metal floor 34 extends substantially beyond the rear wall of the wagon box as does the conveyor belt 35. This distance past the rear wall 29 is sufficiently great so that there will be no free flow of material during the periods when the gate 100 is open and the trailer is not moving.

In FIGS. 9 through 14 and in the second form of the present invention disclosed therein, parts identical with parts in the first form of the present invention will be identically numbered. A trailer frame 11 has a pair of trailer wheel supporting shafts 12 and 13, respectively, on which trailer wheels 24, 25 and 26, 26 are rotatably mounted. These shafts are held with torsion springs 16 as in the first form of the invention.

The wagon box 27 includes parallel, vertical side walls 30, 30 converging bin-like side walls 31, 31 and lower parallel, vertical side walls 32 and 33. The bottom of the wagon box 27 is closed with a horizontal sheet metal floor 34 which extends rearwardly from the wagon box to position over a distributing mechanism.

The fertilizer feed mechanism in the second form of the invention includes an endless conveyor belt 35 having an upper portion thereof in adjacent sliding contact with an upper surface of floor 34. The conveyor belt 35 is mounted on an idler roller at the forward end of the box and on a drive roller 48. The drive roller 48 is mounted on a lower axle 40 that is driven through a sprocket and chain arrangement, as in the previous form of the invention.

A friction wheel supporting assembly 45 is pivotally mounted with respect to the trailer frame and rotatably supports a friction wheel 51 which may be moved into contact with the ground engaging trailer wheel 24 through the instrumentality of a lever 60 and a link 62. The lever 60 is pivotally mounted to a lever bracket 109 with a bolt 61. The lever bracket 109 is fixedly attached to trailer frame 11. The friction wheel 51 can be moved into contact with the trailer wheel 24 or released from contact with said trailer wheel as desired. When friction wheel 51 is in contact with the wheel 24, said wheel 24 serves as a drive wheel for the friction wheel. The friction wheel 51 is connected through a suitable shaft and sprocket arrangement, as in the first form of the invention, to drive the conveyor belt 35.

A hood 110 is mounted on support straps 111 and is supported thereby over the conveyor belt 35. This prevents the fertilizer carried by the wagon box 27 from packing down onto the conveyor belt and aids in the easy operation of the belt. It also insures even fertilizer flow to the belt, and makes the rate of feed more uniform. The hood extends substantially the entire length of the wagon box, terminating in a slightly spaced relationship to the ends thereof.

The wagon box 27 has a rear end panel 112 that has a forwardly sloping lower portion 113. The forwardly sloping portion 113 has an opening 114 cut therethrough. A gate 115 is slidably mounted on suitable guides 116, 116 and is positioned to cover the opening. The gate has a fixedly attached bracket 117 through which a crank 120 is threadably mounted. A collar 121 that is fixedly attached to the crank 120 is rotatably mounted in a second bracket 125 that is fixedly attached with respect to the end panel 112. As the crank 120 is rotated, the gate 115 can be moved up and down. The gate 115 has an inwardly flared portion 122 at the bottom edge thereof forming a lip to tend to raise material above said lip as said conveyor 35 urges material toward opening 114. This serves to prevent compaction of fertilizer at the bin discharge point.

An indicator scale 123 is fixedly attached to the lower portion 113 of the end panel. An indicator rod 124 is fixedly attached to the gate 115 and extends to position adjacent the scale 123.

*Distributor Mechanism*

A portion of the bin like walls 31, 31 extend rearwardly of the wagon box 27 to form funnel-like walls 127, 127 of a distributing chute indicated generally at 128. A deflector plate 129 is adjustably mounted between rearwardly extending portions of the vertical lower walls 32 and 33 in slots 134 through the instrumentality of integral outwardly extending bolts 135. Adjustment can be from front to rear in the slots and can be angular about the axis of bolts 135. An upright divider 130 is fixedly attached to the deflector plate 129 and extends vertically upwardly and forwardly therefrom. A sealing strip 131 that can be made of a flexible material, such as tire carcass, is fixedly attached to the vertical divider as shown and rides closely adjacent or against the conveyor belt 35. An inverted V-shaped divider 132 and a back plate 133 that is inclined downwardly and rearwardly are integrally attached to each other and can be moved forwardly or rearwardly within a slot 136 that is defined in the outward extension of the lower walls 32, 33. The inverted V-shaped divider is positioned below the conveyor belt 35 and extends forwardly from the rear roller 48 for the conveyor belt. The deflector plate 129 is positioned rearwardly of the conveyor belt 135 and is designed to direct the material coming from the conveyor belt onto the inverted V-shaped divider and back plate assembly.

A pair of twin distributor discs 137, 137 are mounted on disc drive shafts 138, 138 and have blades 139 extending up from them. Each of the drive shafts 138, 138 are mounted in bearings 140, 140 that in turn are fixedly attached with respect to the trailer frame. The discs are inclined inwardly toward each other and also forwardly in order to provide that the fertilizer will be thrown clear of any ground trash, such as corn stalks, as it is being spread. Drive pulleys 141, 141 are mounted on the disc drive shafts and a V-belt 142 extends from a drive pulley 143 mounted on a forwardly extending main drive shaft 144 that is rotatably mounted with respect to the box. The V-belt 142 is mounted over the pulleys 141, 141 and a pair of idler sheaves 147, 147 are positioned on a bracket 148 and serve to guide the belt onto the driven disc sheaves 141, 141. There is no universal joint connection in the fan drive shafts, as the belt 142 is properly guided into the inclined or angled driven pulleys 141, 141 through the use of the idler sheaves 147, 147 and proper positioning of drive pulley 143.

The main drive shaft 144 is driven from the tractor power take-off through a power take-off shaft 84 that is mounted through a universal joint 85 to a drive counter shaft 149 that in turn is rotatably mounted on bearings 150, 150. A sheave 87 is drivably mounted on the counter shaft 149 and a belt 88 extends up to a second sheave 89 which is drivably connected to the main drive shaft 144.

A shield 151 is positioned over the V-belt 142 and associated sheaves and prevents people from becoming entangled in the mechanism, as well as shielding it from dirt and trash.

A hand operated jack 152 may be positioned with respect to the trailer frame 11 and used to support the trailer so that it may be easily hooked up to a tractor. The jack is made so that it can be moved out of the way when the unit is being used. The unit can be easily handled by one man, even when fully loaded. The trailer is well balanced on the tandem wheels and the jack 152 aids in disconnecting or hooking up by carrying any load on the hitch.

A curved deflector shield 153 is fixedly attached to the trailer frame 11 and positioned in front of the twin distributor discs 137, 137. This prevents any stray fertilizer material from being thrown forwardly.

*Operation of the Second Form of the Invention*

When the spreader has been loaded with fertilizer, the farmer will pull his trailer to his field. The farmer will turn crank 120 until the gate 115 is open the proper distance for the amount of fertilizer that he wants distributed on his field and then will position the frame 45 so the drive wheel 51 engages the trailer wheel 24 to drive the conveyor belt 35. Power take-off shaft 86 will be hooked to the power take-off of the tractor and engaged to drive the twin distributor discs 137, 137. The entire weight of the fertilizer within the box will not affect the conveyor belt 135 as the hood 110 will prevent much of the weight from bearing directly on it and the conveyor belt will, consequently, be easy to start. However, fertilizer will flow underneath the shield 110 so that the belt 35 will carry a proper amount of fertilizer at all times. The gate 115 will limit the amount of the fertilizer on the belt 35 leaving the wagon box.

Fertilizer will be moved by the belt 35 rearwardly until the belt goes around the rear roller 48. At this time the vertical divider 130 will serve to divide half of the fertilizer on the belt to one side of the deflector plate 129 and the other half of the fertilizer to the other side of the deflector plate 129. The fertilizer will hit the deflector plate and this in turn will direct the fertilizer down onto the inverted V-shaped divider 132. The back plate 133 will direct the fertilizer rearwardly so it will drop out through provided openings 155, 155. The openings 155, 155 are positioned above the twin distributing discs 137, 137. The inverted V-shaped divider 132 discharges at a sufficient angle so that the fertilizer, represented by dotted lines as at 156 in FIG. 14, will discharge through the openings 155 and will be carried outwardly by inertia onto the discs 137, 137. The fertilizer will hit the upper surface of the discs between the innermost edges of the upstanding blades 139 on each of the discs and the center of rotation of the disc.

By moving the inverted V-shaped divider 132, together with the fixedly attached back plate 133 forwardly or rearwardly the position of the openings 155, 155 in relation to the distributing discs can be adjusted. This will control the density of fertilizer distribution across the spread path. When the discharge openings 155, 155 are positioned forwardly along the longitudinal axis of the spreader, the coverage pattern is heavier toward the center of the spread path then when these openings are positioned rearwardly.

The center divider 130 that is mounted on the deflector plate 129 can be adjusted so that the flexible strip 131 at all times is closely adjacent or contacting the conveyor belt 135 to insure that one half of the fertilizer material coming from the belt will go to each of the openings 155, 155.

The inclined lower portion 113 of the rear end panel of the wagon box, together with the sliding gate, and its inwardly flared lip, insures that the fertilizer will not compact as it moves toward the rear. This helps maintain an even flow of fertilizer from the conveyor belt 135 and makes measurement of the fertilizer more accurate as well as preventing plugging or stoppage.

The action of the discs in the second form of the invention is substantially identical to that in the first form. The added feature of being able to adjust the position of the discharge openings 155, 155 allows for greater flexibility in usage and allows the farmer to establish the pattern of spread density that he desires. The fact that the material will drop into a clear portion on the distributor fans permits a wider spread pattern than if the fertilizer material is dropped directly onto the blades.

As explained in connection with the first form of the invention, the drive mechanism for the conveyor belt will provide more driving force when the trailer is fully loaded as the weight will force trailer wheel 24 more firmly against the friction wheel 51.

What is claimed is:

1. The combination with a self-unloading wagon box having an endless conveyor capable of delivering bulk materials to a discharge point outside of and to the rear of said wagon box, of: a pair of distributor discs rotatably mounted outside of and to the rear of said wagon box about separate axes which are inclined from vertical toward each other and forwardly in an upward direction, a plurality of upstanding blades on each of said discs, said blades extending substantially radially outward from the axes of said discs with the inner ends of said blades terminating in spaced relationship to said axes, means for rotating said discs at a predetermined speed, a distributing chute for materials leaving said conveyor at said discharge point, said chute including a divider situated vertically below said discharge point in position to divert substantially half of the materials coming from said conveyor toward each of said discs, said chute being provided with a separate bottom outlet opening located above each of said discs, each of said outlets being vertically positioned to deliver said bulk materials to position between the rotational center of its underlying disc and the inner most ends of the blades on said disc.

2. The combination as specified in claim 1 and means for adjustably positioning said distributing chute to vary the relationship of said discharge openings with respect to said discs.

3. The combination with a self-unloading wagon box having an endless conveyor capable of delivering bulk materials to a discharge point outside of and to the rear of said wagon box, of: a pair of distributor disc shafts rotatably mounted outside of and to the rear of said wagon box, the axes of said shafts being inclined from vertical toward each other and forwardly in an upward direction, a pair of distributor discs, one fixedly attached to each of said shafts, a plurality of upstanding blades on each of said distributor discs, said blades extending substantially radially outward from the rotational centers of said discs, a separate driven V-belt sheave drivably mounted on the upper end of each of said distributor disc shafts, the planes of said sheaves being substantially at right angles to the axes of their respective shafts, a drive shaft rotatably mounted with respect to said wagon box and extending from the forward end thereof to the rear thereof in a substantially horizontal plane, a drive V-belt sheave drivably mounted on a rearwardly extending end of said drive shaft, the plane of said drive V-belt sheave being substantially perpendicular to said drive shaft, a pair of guide V-belt sheaves rotatably mounted with respect to said wagon box between said distributor disc sheaves, a V-belt mounted on said drive sheave, thence to a first of said distributor disc sheaves, thence to a first of said guide sheaves, thence to a second of said distributor disc sheaves, thence to a second of said guide sheaves, and thence back to said drive sheave, said drive sheave and said guide sheaves being positioned so that said V-belt will be driven by said drive sheave and will drive said discs without additional guide members, means for rotating said drive shaft at a predetermined speed, a distributing chute for materials leaving said conveyor at said discharge point, said chute including a divider situated vertically below said discharge point and positioned to divert substantially half of the material coming from said conveyor toward each of said discs, said chute being provided with a separate bottom outlet opening located above each of said discs.

4. The combination with a self-unloading wagon box having an endless conveyor capable of delivering bulk materials to a discharge point outside of and to the rear of said wagon box, of: a pair of distributor disc shafts rotatably mounted outside of and to the rear of said wagon box and extending in an upward direction forwardly and toward each other, a pair of distributor discs, one fixedly attached to each of said shafts, a plurality of upstanding blades on each of said distributor discs, said blades extending substantially radially outward from the rotational centers of said discs with the inner ends of said blades terminating in spaced relationship to said rotational centers, a separate driven V-belt sheave drivably mounted on the upper end of each of said distributor disc shafts, the planes of said sheaves being substantially at right angles to the axes of their respective shafts, a drive shaft rotatably mounted with respect to said wagon box and extending from the forward end thereof to the rear thereof in a substantially horizontal plane, a drive V-belt sheave drivably mounted on a rearwardly extending end of said drive shaft, the plane of said drive V-belt sheave being substantially perpendicular to said drive shaft, a pair of guide V-belt sheaves rotatably mounted with respect to said wagon box between said distributor disc sheaves, a V-belt mounted on said drive sheave, thence to a first of said distributor disc sheaves, thence to a first of said guide sheaves, thence to a second of said distributor disc sheaves, thence to a second of said guide sheaves, and thence back to said drive sheave, said drive sheave and said guide sheaves being positioned so that said V-belt will be driven by said drive sheave and will drive said discs without additional guide members, means for rotating said drive shaft at a predetermined speed, a distributing chute for materials leaving said conveyor at said discharge point, said chute including a divider situated vertically below said discharge point and positioned to divert substantially half of the material coming from said conveyor toward each of said discs, said chute being provided with a separate bottom outlet opening located above each of said discs, each of said outlets being vertically positioned to deliver said bulk materials to position between the rotational center of its underlying disc and the innermost ends of the blades on said disc, said chute being adjustable forwardly and rearwardly to change the position at which said bulk material is deposited on said distributor discs.

References Cited in the file of this patent

UNITED STATES PATENTS

| | | |
|---|---|---|
| Re. 22,020 | Fulkerson et al. | Feb. 10, 1942 |
| 323,683 | Hotham | Aug. 4, 1885 |
| 894,948 | Guthrie | Aug. 4, 1908 |
| 1,263,105 | Plummer | Apr. 16, 1918 |
| 1,613,988 | Flack | Jan. 11, 1927 |
| 2,323,262 | Warren | June 29, 1943 |
| 2,340,657 | Goertzen | Feb. 1, 1944 |
| 2,340,810 | Hoffstetter | Feb. 1, 1944 |
| 2,564,494 | Morrison | Aug. 14, 1951 |
| 2,594,084 | Skibbe et al. | Apr. 22, 1952 |
| 2,614,849 | Holben | Oct. 21, 1952 |
| 2,766,872 | Pillsbury | Oct. 16, 1956 |
| 2,946,597 | Simonsen | July 26, 1960 |
| 2,969,987 | De Biasi | Jan. 31, 1961 |
| 2,988,368 | Kerr | June 13, 1961 |